Patented July 23, 1935

2,008,986

UNITED STATES PATENT OFFICE 2,008,986

PREPARATION OF CELLULOSE DERIVATIVES CONTAINING PHOSPHORUS

Carl J. Malm and Charles R. Fordyce, Rochester, N. Y., assignors to Eastman Kodak Company, Rochester, N. Y., a corporation of New York No Drawing. Application February 18, 1932, Serial No. 593,868

22 Claims. (Cl. 260—101)

The present invention relates to the preparation of cellulose derivatives containing phosphorus by treating cellulose or a cellulose derivative with an acid chloride of phosphoric acid, which acid chloride has only one chlorine atom attached to the phosphorus of each molecule.

There have been many processes described in the literature for making cellulose derivatives containing phosphorus but none of these appear to have had any great amount of commercial success. For example processes have been described of making phosphorus-containing cellulose derivatives in which cellulose has been treated with acetic anhydrid in the presence of sulfuric acid and phosphorus oxychloride. In that process, at the most there could be but a very small amount of phosphorus present in the resulting cellulose acetate as the phosphorus oxychloride used in the process is present only in an amount sufficient to act as a catalyst for the acetylation of the cellulose.

Various other processes such as the treatment of soda cellulose with phosphorus oxychloride and pyridine (in which a degraded final product results), the acetylation of cellulose in the presence of phosphoric acid, treating of cellulose acetate with monophenyl phosphate in the presence of pyridine, have been proposed for producing cellulose derivatives containing phosphorus but due to various reasons perhaps chiefly because of lack of desirable solubilities of the resulting products these methods have not had much, if any, commercial application.

An object of the present invention is to provide a process whereby derivatives of cellulose containing phosphorus may be prepared. Another object of our invention is to provide a process of producing cellulose derivatives which may be employed in the manufacture of various commercial products of satisfactory quality, for which other non-phosphorus containing derivatives of cellulose are employed at the present time. A further object of our invention is to provide a cellulose derivative which has unusual fire-resistant properties and which will sustain combustion only with great difficulty and under the most favorable fire-promoting conditions. Other objects of our invention will hereinafter appear.

Heretofore it appears that the cellulose derivatives containing phosphorus have been insoluble in many of the organic solvents which are commonly employed for the dissolution of cellulose derivatives. One of the more important solvents of this class is acetone and nowhere has a method of making phosphorus-containing cellulose derivatives been disclosed to our knowledge, by which derivatives are formed which are soluble in water-free acetone.

We have found that derivatives of cellulose containing phosphorus which are even soluble in an undiluted acetone may be formed by reacting upon a cellulose derivative containing free hydroxyl groups, with the acid chloride of a phosphoric acid ester containing in each molecule only one chlorine atom attached to the phosphorus in the molecule. Of course a cellulose derivative may be reacted upon by such a compound in which two chlorine atoms are attached to the phosphorus but the product will be insoluble in most of the organic solvents including acetone which are employed for cellulose derivatives.

The following illustrations, in which only the portion of the cellulose acetate which may be regarded as replaceable is shown, roughly illustrate the reaction structurally which it is believed takes place according to the process of our invention when acid chlorides containing one and those containing two chlorine atoms attached to the phosphorus are employed:

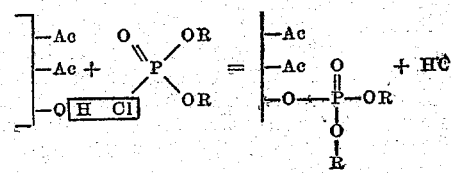

in which

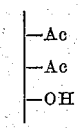

represents one $C_6$ portion of the cellulose unit in a partially acetylated cellulose acetate such as the ordinary hydrolyzed acetone-soluble cellulose acetate, Ac represents an acetyl group and R represents an aryl group such as cresyl, phenyl, etc.

When two chlorine atoms are attached to the phosphorus atom in the compound which is allowed to react upon the partially saponified cellulose acetate, the product formed, is insoluble in acetone. The reaction in such a case is believed to take place so that at least two cellulose units are joined in one unit of the resulting compound probably as follows:

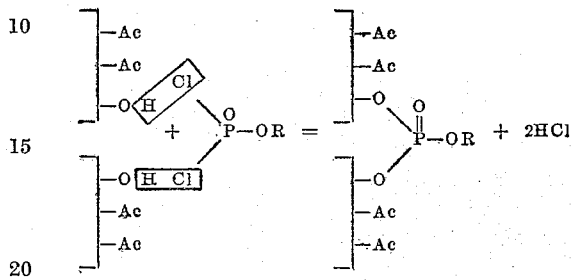

We shall now give an example of one specific embodiment of our invention and it is to be understood that this example is merely illustrative and not limiting of the scope of our invention.

About 150 lbs. of phosphorus oxychloride was mixed with about 235 lbs. of cresol (about 2.2 molecules of cresol to 1 of POCl$_3$) and these compounds combined chemically to form a dicresyl chlorophosphate. When the reaction was over, about 250 lbs. of ordinary, commercially-available, hydrolyzed, acetone-soluble cellulose acetate dissolved in a solvent comprising a mixture of ethylene chloride and pyridine, was added to the mass and the whole was kept at 60° C. for about 4 hrs. The reaction mixture was then precipitated in alcohol and washed. The resulting product contains phosphorus and is soluble in acetone. Sheets or skins may be coated out from an acetone solution of the product having satisfactory flexibility and a very high resistance to combustion. Due to the burning-resistance characteristics of this product in sheet form it gives promise of being of great value to the motion picture industry in which resistance of film to fire is desired and in some instances such as in the case of amateur cinematic work it is practically essential that a fire-resistant film be employed. The film made using our product as a base when ignited, exhibits only a flickering blaze for an instant and then apparently extinguishes its own flame leaving the edge of the film which the fire affected as a fused, dark, resinous-appearing edge of small width.

Various modifications of our process are permissible without departing from the scope of our invention. For example instead of cresol, a phenol such as phenol itself or an aliphatic alcohol such as ethyl or methyl may be employed to form the acid chloride with POCl$_3$. It is of course apparent from the fact that cresol is suitable for combination with the POCl$_3$ that substituted alcohols and phenols may also be employed in our process, for example an alkoxy ethyl alcohol may be employed if desired or a naphthol may be used as the hydroxy compound to unite with the phosphorus oxychloride according to our invention.

Instead of pyridine other tertiary organic bases may be employed in our process such as alpha-picoline and quinoline, however, pyridine, due to its low cost and the satisfactory results obtained when it is employed is preferred in the carrying out of our process on a commercial scale. Obviously other inert liquids which together with the organic bases, are solvents of cellulose acetate may be employed in our process instead of ethylene chloride however here also economic considerations dictate the selection of ethylene chloride as the solvent to be employed in commercial operations where the cost of the materials entering into the process is of importance.

If desired in our process the acid chloride may be supplied in some other manner than that disclosed in the example, such as by adding the compound per se or by employing some other reaction, however, we have found that the operation described in the example for preparing these acid chlorides to be the simplest and most satisfactory method of supplying these compounds in our process.

As was pointed out above, the phosphorus-containing compounds are eminently suited for the manufacture of films, sheets and skins. Our esters may also be employed in the manufacture of artificial silk, the fabric made therefrom being especially useful where a fire-resistant material is desired. The esters resulting from our process may be employed in preparing lacquers for surfaces which are subjected to temperatures higher than ordinarily encountered by most lacquered articles. For any or all of these uses, plasticizers such as triphenyl or tricresyl phosphate may be incorporated in the product formed preferably by mixing it with the cellulose ester solution before the solution is converted into the particular product desired. Other plastic materials such as nitrocellulose, cellulose acetate, gums (synthetic or natural) resin and/or waxes which are compatible therewith may also be mixed with our phosphorus-containing cellulose ester to form the particular product desired.

If it is desired a higher ester of cellulose such as a cellulose propionate, butyrate etc., which has free and available hydroxyl groups replaceable by phosphorus-containing groups, may be employed in our process instead of cellulose acetate.

Our process can also be employed to react upon cellulose proper however the cellulose will not be fully esterified and the esters formed will not have the solubilities of the esters prepared by our invention when cellulose derivatives are employed as starting materials. However our esterification process may be used for treating threads of cellulose (such as cotton) to render them resistant to fire and moisture. Such threads treated by the process of our invention also have a satisfactory dielectric strength and are eminently suitable for electrical insulation purposes.

Various other modifications of the process of our invention will be obvious to those skilled in the art and such modifications are within the scope of our invention.

Where the term "cellulosic material" is employed herein it is to be understood as referring to any material "of or pertaining to cellulose" which is susceptible to esterification. This term thus includes both esterifiable cellulose proper and cellulose derivatives which contain free and replaceable hydroxyl groups.

We claim as our invention:

1. A process of preparing a phosphorus-containing cellulose derivative which comprises treating cellulosic material with an acid chloride of a phosphoric acid ester, in which not more than one chlorine atom is attached to the phosphorous atom of each molecule.

2. A process of preparing a phosphorus-containing ester of cellulose which comprises reacting upon a fatty acid ester of cellulose containing free and esterifiable hydroxyl groups with an acid chloride of a phosphoric acid ester in which not more than one chlorine atom is attached to the phosphorus atom of each molecule.

3. A process of preparing a phosphorus-containing ester of cellulose which comprises combining phosphorus oxychloride with a monohydroxy organic compound containing substituents which are non-reactive to the phosphorus oxychloride and the cellulose ester in porportions which will leave substantially not more than one chlorine atom attached to each respective phosphorous atom and then by means of the resulting mass reacting upon a fatty acid ester of cellulose containing free and available hydroxyl groups to form a phosphorus-containing ester of cellulose.

4. A process of preparing a phosphorus-containing ester of cellulose which comprises reacting upon an acetate of cellulose containing free and esterifiable hydroxyl groups with an acid chloride of a phosphoric acid ester in which not more than one chlorine atom is attached to the phosphorus atom of each molecule.

5. A process of preparing a phosphorus-containing ester of cellulose which comprises reacting upon an acetate of cellulose containing free and esterifiable hydroxyl groups with the mass formed by combining phosphorus oxychloride with a monohydroxy organic compound containing substituents which are non-reactive to the phosphorus oxychloride and the cellulose ester in proportions which will leave substantially not more than one chlorine atom attached to each respective phosphorus atom.

6. A process of preparing a phosphorus-containing ester of cellulose which comprises reacting upon a fatty acid ester of cellulose containing free and esterifiable hydroxyl groups with an acid chloride of a phosphoric acid ester in which not more than one chlorine atom is attached to the phosphorus portion of each molecule in the presence of a tertiary organic base.

7. A process of preparing a phosphorus-containing ester of cellulose which comprises combining phosphorus oxychloride with a monohydroxy organic compound containing substituents which are non-reactive to the phosphorus oxychloride and the cellulose ester in proportions which will leave substantially not more than one chlorine atom attached to each respective phosphorus atom and then by means of the resulting mass reacting upon a fatty acid ester of cellulose containing free and available hydroxyl groups in the presence of an organic base to form a phosphorus-containing ester of cellulose.

8. A process of preparing a phosphorus-containing ester of cellulose which comprises reacting upon an acetate of cellulose containing free and esterifiable hydroxyl groups with an acid chloride of a phosphoric acid ester in which not more than one chlorine atom is attached to the phosphorus portion of each molecule in the presence of a tertiary organic base.

9. A process of preparing a phosphorus-containing ester of cellulose which comprises reacting upon an acetate of cellulose containing free and esterifiable hydroxyl groups with the mass formed by combining phosphorus oxychloride with a monohydroxy organic compound containing substituents which are non-reactive to the phosphorus oxychloride and the cellulose ester in proportions which will leave substantially not more than one chlorine atom attached to each respective phosphorus atom in the presence of a tertiary organic base.

10. A process of preparing a phosphorus-containing ester of cellulose which comprises reacting upon a fatty acid ester of cellulose containing free and esterifiable hydroxyl groups with an acid chloride of a phosphoric acid ester in which not more than one chlorine atom is attached to the phosphorus portion of each molecule in the presence of pyridine.

11. A process of preparing a phosphorus-containing ester of cellulose which comprises combining phosphorus oxychloride with a monohydroxy organic compound containing substituents which are non-reactive to the phosphorus oxychloride and the cellulose ester in proportions which will leave substantially not more than one chlorine atom attached to each respective phosphorus atom and then by means of the resulting mass reacting upon a fatty acid ester of cellulose containing free and available hydroxyl groups in the presence of pyridine to form a phosphorus-containing ester of cellulose.

12. A process of preparing a phosphorus-containing ester of cellulose which comprises reacting upon an acetate of cellulose containing free and esterifiable hydroxyl groups with an acid chloride of a phosphoric acid ester in which not more than one chlorine atom is attached to the phosphorus portion of each molecule, in the presence of pyridine.

13. A process of preparing a phosphorus-containing ester of cellulose which comprises reacting upon a fatty acid ester of cellulose containing free and esterifiable hydroxyl groups with the mass formed by combining phosphorus oxychloride with a phenol in proportions which will leave substantially not more than one chlorine atom attached to each respective phosphorus atom.

14. A process of preparing a phosphorus-containing ester of cellulose which comprises reacting upon an acetyl cellulose containing free and esterifiable hydroxyl groups with the mass formed by combining phosphorus oxychloride with a phenol in proportions which will leave substantially not more than one chlorine atom attached to each respective phosphorus atom.

15. A process of preparing a phosphorus-containing ester of cellulose which comprises reacting upon a fatty acid ester of cellulose containing free and esterifiable hydroxyl groups with the mass formed by combining phosphorus oxychloride with cresol in proportions which will leave substantially not more than one chlorine atom attached to each respective phosphorus atom.

16. A process of preparing a phosphorus-containing ester of cellulose which comprises reacting upon an acetyl cellulose containing free and esterifiable hydroxyl groups with the mass formed by combining phosphorus oxychloride with cresol in proportions which will leave substantially not more than one chlorine atom attached to each respective phosphorus atom.

17. A process of preparing a phosphorus-containing ester of cellulose which comprises reacting upon a fatty acid ester of cellulose containing free and esterifiable hydroxyl groups with the mass formed by combining phosphorus oxychloride with a phenol in proportions which will leave substantially not more than one chlorine atom attached to each respective phosphorus atom, in the presence of a tertiary organic base.

18. A process of preparing a phosphorus-containing ester of cellulose which comprises reacting upon a fatty acid ester of cellulose containing free and esterifiable hydroxyl groups with the mass formed by combining phosphorus oxychloride with a phenol in proportions which will leave substantially not more than one chlorine atom attached to each respective phosphorus atom, in the presence of pyridine.

19. A process of preparing a phosphorus-containing ester of cellulose which comprises reacting upon a fatty acid ester of cellulose containing free and esterifiable hydroxyl groups with the mass formed by combining phosphorus oxychloride with cresol in proportions which will leave not substantially more than one chlorine atom attached to each respective phosphorus atom in the presence of pyridine.

20. A process of preparing a phosphorus-containing ester of cellulose which comprises reacting upon a fatty acid ester of cellulose containing free and esterifiable hydroxyl groups with the mass formed by combining phosphorus oxychloride with cresol in proportions which will leave not substantially more than one chlorine atom attached to each respective phosphorus atom in the presence of a tertiary organic base.

21. A process of preparing a phosphorus-containing ester of cellulose which comprises reacting upon an acetyl cellulose containing free and esterifiable hydroxyl groups with the mass formed by combining phosphorus oxychloride with cresol in proportions which will leave not substantially more than one chlorine atom attached to each respective phosphorus atom in the presence of pyridine.

22. The compound represented by the formula

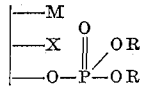

in which

represents a $C_6$ unit of cellulose, R represents an aryl group, M represents either a hydroxyl or fatty acid group and X represents either a hydroxyl, fatty acid, or

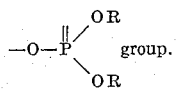 group.

CARL J. MALM.
CHARLES R. FORDYCE.